Nov. 27, 1956
A. LIGUORI
2,772,387
POWER SUPPLY WITH REGULATED POSITIVE
AND NEGATIVE OUTPUT VOLTAGES
Filed Oct. 29, 1953
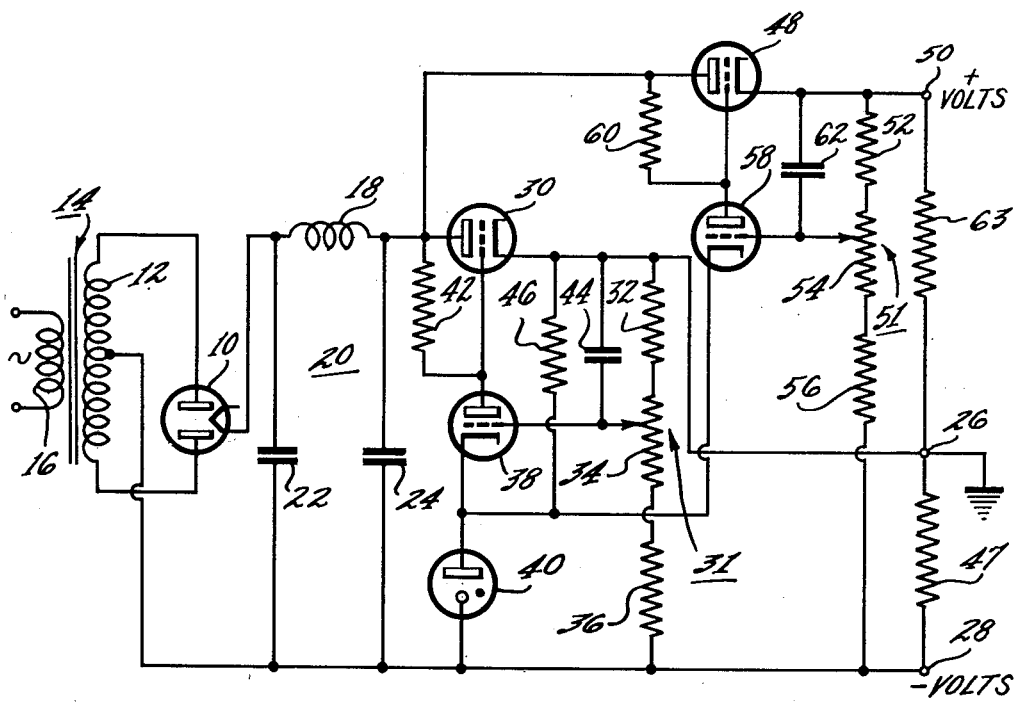
INVENTOR.
*Anthony Liguori*
BY *Morris A. Rabbin*
ATTORNEY

United States Patent Office

2,772,387
Patented Nov. 27, 1956

2,772,387

POWER SUPPLY WITH REGULATED POSITIVE AND NEGATIVE OUTPUT VOLTAGES

Anthony Liguori, Hackensack, N. J., assignor to Radio Corporation of America, a corporation of Delaware Application October 29, 1953, Serial No. 389,117

4 Claims. (Cl. 323—22)

This invention relates generally to power supplies, and more particularly to novel electronically regulated power supplies adapted to provide both a positive and a negative unidirectional regulated output voltage.

By a positive or negative output voltage, as used in this specification and in the appended claims, is meant an output voltage which is positive or negative, respectively, with respect to a reference potential, such as ground.

Heretofore, when it has been desired to provide both a positive regulated output voltage and a negative regulated output voltage, two complete power supplies were used. To use two power supplies, however, requires the use of two power transformers, two rectifier circuits, two filter networks, and two electronic regulator circuits. It is obvious that such an arrangement is relatively expensive, and adds to the complexity of the circuitry as well as to the weight of the equipment where these power supplies are employed.

It is, therefore, a principal object of the present invention to provide an improved power supply adapted to provide both regulated positive and negative output voltages from a single source of rectified voltage.

Another object of the present invention is to provide an improved power supply of the type described which uses only one power transformer, one rectifier and one filter in common with two regulatory circuits to provide both regulated positive and negative output voltages.

A further object of the present invention is to provide an improved power supply of the type described which is economical in both cost and components, is simple in operation and construction, and is relatively highly efficient in use.

These and further objects of the present invention are attained in an improved power supply wherein a source of unidirectional voltage, which tends to vary with the load and/or with voltage variations at the source, is adapted to provide regulated positive and negative output voltages. The source of unregulated voltage is obtained from the usual rectifier circuit wherein an alternating voltage is rectified, as by a full wave rectifier, and filtered by the usual π-filter network. The regulated negative output voltage is obtained across a voltage divider connected in series with the unregulated source of voltage through a variable impedance device. Feedback means are provided for controlling the impedance of the variable impedance device in accordance with changes in voltage drop across the voltage divider. To provide for a regulated positive output voltage, a second voltage divider is connected in series with the filtered rectified voltage source through a second variable impedance device. A second feedback means is provided for controlling the impedance of the second variable impedance device in accordance wth charges in the voltage drop across the second voltage divider. The regulated positive output voltage is obtained between the output of the first and second variable impedance devices.

The novel features of the present invention, as well as the invention itself, both as to its organization and method of operation will be understood in detail from the following description when considered in connection with the drawing, which is a schematic diagram of a power supply providing both regulated positive and negative output voltages, in accordance with the present invention.

Referring now to the drawing, there is shown a power supply in accordance with the present invention, wherein a full wave rectifier tube 10 has its anodes connected to the ends of a center tapped secondary winding 12 of a power transformer 14. The primary winding 16 of the transformer 14 is connected across any source of suitable alternating voltage (not shown). The filament of the rectifier tube 10 is connected across a source of suitable voltage (not shown), for heating purposes, and to an inductance 18 of a π-filter network 20. The filter capacitors 22 and 24 of the filter network 20 are connected between respective ends of the inductance 18 and the center tap of the secondary winding 12. The voltage across the capacitor 24 from the circuit thus far described is a source of unregulated unidirectional voltage which would tend to vary with changes in a load thereacross and/or changes in the input alternating voltage across the primary winding 16. In accordance with the structure and function of the present invention, the source of unregulated unidirectional voltage across the capacitor 24 is used as a common voltage source to provide both positive and negative regulated output voltages.

A regulated negative output voltage is obtained across output terminals 26 and 28. The terminal 28 is connected directly to the center tap of the secondary winding 12, and the output terminal 26 is connected to the junction between the inductance 18 and the capacitor 24 through a variable impedance device, or triode tube 30. The anode of the triode 30 is connected to the inductance 18, and the cathode thereof is connected to the output terminal 26. A voltage divider 31, comprising a resistor 32, a potentiometer 34 and a resistor 36 connected in series with each other, is connected across the output terminals 26 and 28. The terminal 26 may be connected to a source of reference potential, such as ground. A negative regulated output voltage is derived across the output terminals 26 and 28; the voltage at the terminal 28 being negative with respect to the reference potential at the terminal 26.

Means are provided for controlling the impedance of the variable impedance tube 30 in accordance with changes in voltage drop across the voltage divider 31. To this end, an amplifier, such as an electron discharge tube 38, has an input circuit connected to the voltage divider 31 and an output circuit connected to the control electrode, or grid, of the variable impedance tube 30. Specifically, the grid of the amplifier tube 38 is connected to the movable tap on the potentiometer 34, and the cathode of the tube 38 is connected to the output terminal 28 through a glow tube, or voltage regulator tube 40. The anode of the tube 38 is connected to the anode of the tube 30 through a load resistor 42, and to the grid of the tube 30. The cathode of the tube 30 is connected to the grid of the tube 38 through a capacitor 44, and to the cathode of the tube 38 through a resistor 46. The resistor 46 provides a path for current through the voltage regulator tube 40.

The operation of the power supply for producing a regulated negative output voltage will now be described. Any decrease in the input A. C. voltage across the primary 16 of the transformer 14, or any increase in the load 47, represented as a resistor across the output terminals 26 and 28, will tend to cause a decrease in the output voltage across the output terminals 26 and 28. The voltage drop across the voltage divider 31 will, in turn, decrease, and the feedback signal applied to the grid of the amplifier 38 will also decrease. Since the cathode of the amplifier tube 38 is kept substantially constant by means of the substantially constant voltage drop across the voltage regulator tube 40, the current flowing through the amplifier tube 38 will now decrease. Consequently, there is a resultant positive-going signal, derived from the anode of the amplifier tube 38, that is applied to the control grid of the tube 30. As a result of the grid of the variable impedance tube 30 going positive, the impedance of the tube 30 is decreased, and more current will flow to the load 47 and consequently offset the tendency of the voltage across the terminals 26 and 28 to drop. An increase in the input A. C. voltage across the primary winding 16 of the transformer 14, and/or a decrease in the load 47 across the terminals 26 and 28 will produce a reverse effect, thereby tending to maintain the negative output voltage across the terminals 26 and 28 substantially constant.

Means are provided to derive a regulated positive output voltage from the same source of unregulated unidirectional voltage used for the regulated negative output voltage. To this end, a variable impedance device, or triode tube 48, similar to the tube 30, is connected between the junction of the capacitor 24 and the inductance 18 and a positive output terminal 50. A voltage divider 51, comprising a resistor 52, a potentiometer 54 and a resistor 56 connected in series with each other, is connected between the terminals 50 and 28.

A regulated positive output voltage may be derived across the terminals 50 and 26. Means for controlling the impedance of the variable impedance device 48 in accordance with changes in voltage drop across the voltage divider 51 are provided for regulatory purposes. To this end, an amplifier, as for example a triode tube 58, similar to the amplifier tube 38, has an input circuit connected to the voltage divider 51 and an output circuit connected to the control electrode, or grid, of the variable impedance tube 48. Specifically, the grid of the amplifier tube 58 is connected to the movable tap on the potentiometer 54, and the cathode of the tube 58 is connected to the cathode of the tube 38. The anode of the tube 58 is connected to the anode of the tube 48 through a load resistor 60. The cathode of the tube 48 is connected to the grid of the tube 58 through a capacitor 62.

The operation of the power supply, in accordance with the present invention, for providing a regulated positive output voltage will now be described. Any tendency of the input A. C. voltage across the primary winding 16 of the transformer 14 to decrease, and/or any tendency of load 63, represented as a resistor connected across the output terminals 50 and 26, to increase will cause a voltage drop across the voltage divider 51. Consequently, there will be a drop in voltage at the grid of the amplifier tube 58. Since the cathode of the amplifier tube 58 is held at a constant potential by means of the voltage regulator tube 40, conduction through the amplifier tube 58 will decrease. As a result, a positive-going voltage will be applied to the grid of the variable impedance tube 48, whereby its impedance will be decreased and more current will be furnished to the load 63. In this manner, any tendency for the positive output voltage across the terminals 50 and 26 to drop will be off set. Any tendency for the positive output voltage across the terminals 50 and 26 to rise will be off set by a reverse set of conditions, since the grid of the amplifier tube 58 under these latter conditions will tend to go positive.

Thus, there has been shown and described, in accordance with the objects of the present invention, an improved power supply having positive and negative regulated output voltages. The power supply is economical in both cost and components because both the negative and positive regulated output voltages are derived from a single rectifier source, thereby eliminating a second power transformer, rectifier circuit and filter network.

It is also noted that the electron flow from the negative terminal 28, after passing through the load 47, divides at the terminal 26 and returns to the rectifier 10 via two paths. The first of these paths is through the variable impedance tube 30, and the second of these paths is through the load 63 and the variable impedance tube 48. Thus, it is evident that the additional current for the load 63 across the positive output voltage supply does not affect the loading of the transformer 14, since the latter is only rerouting some of the existing current, and not adding to it. With this arrangement, also, there is no unbalancing of the transformer load. The only limitation on the circuit of the present invention is that the current drawn by the load 47 across the terminals 28 and 26 must be at least equal to or greater than a current drawn by the load 63 across the terminals 26 and 50.

What is claimed is:

1. In a power supply of the type wherein a source of variable voltage is regulated by a first variable impedance device connected in series with said source and a first voltage divider, and having a first means comprising a first amplifier having a cathode for controlling the impedance of said device in accordance with changes in voltage drop across said first voltage divider; the combination therewith of a second voltage divider, a second variable impedance device connected in series with said source and said second voltage divider, a second means comprising a second amplifier having a cathode for controlling the impedance of said second device in accordance with changes in voltage drop across said second voltage divider, said first and second voltage dividers having a common junction, said cathodes being connected to each other, and means common to said first and second amplifiers connected between said common junction and said cathodes to maintain the voltage at said cathodes substantially constant with respect to said common junction.

2. In a power supply of the type wherein a source of variable voltage is regulated by a first variable impedance device connected in series with said source and a first voltage divider, and having a first means comprising a first amplifier having a cathode for controlling the impedance of said device in accordance with changes in voltage drop across said first voltage divider; the combination therewith of a second voltage divider, a second variable impedance device connected in series with said source and said second voltage divider, a second means comprising a second amplifier having a cathode for controlling the impedance of said second device in accordance with changes in voltage drop across said second voltage divider, a first output terminal connected to said source, a second output terminal connected to said first device, a third output terminal connected to said second device, said first and second voltage dividers having a common junction connected to said first output terminal, said cathodes being connected to each other, and means common to said first and second amplifiers connected between said common junction and said cathodes to maintain the voltage at said cathodes substantially constant with respect to said common junction.

3. A power supply comprising a single source of variable, unidirectional voltage, first, second and third output terminals, a first voltage divider connected between said first and second terminals, a second voltage divider connected between said first and third terminals, first and second variable impedance devices each having a control electrode, said first device being connected in circuit between said source and said second terminal, said second device being connected in circuit between said source and said third terminal, a first amplifier having an input circuit connected to said first voltage divider and an output circuit connected to said control electrode of said first device, and a second amplifier having an input circuit connected to said second voltage divider and an output circuit connected to said control electrode of said second device, said source comprising a transformer having a primary winding adapted to be connected across a source of A. C. voltage and a secondary winding connected to said first terminal, each of said input circuits of said first and second amplifiers comprising a separate cathode, said cathodes being connected to each other, and means common to said first and second amplifiers and connected between said cathodes and said first terminal to maintain said cathodes at a substantially constant potential with respect to said first terminal.

4. A power supply comprising a single source of variable, unidirectional voltage, first, second and third output terminals, a first voltage divider connected between said first and second terminals, a second voltage divider connected between said first and third terminals, first and second variable impedance devices each having a control electrode, said first device being connected in circuit between said source and said second terminal, said second device being connected in circuit between said source and said third terminal, a first amplifier having an input circuit connected to said first voltage divider and an output circuit connected to said control electrode of said first device, a second amplifier having an input circuit connected to said second voltage divider and an output circuit connected to said control electrode of said second device, said input circuits of said first and second amplifiers each having an electrode, and means common to said last-mentioned electrodes for maintaining said last-mentioned electrodes at a substantially constant voltage with respect to said first terminal.

References Cited in the file of this patent
UNITED STATES PATENTS

| | | |
|---|---|---|
| 2,313,601 | Terry | Mar. 9, 1943 |
| 2,318,644 | Tubbs | May 11, 1943 |
| 2,434,069 | Goldberg | Jan. 6, 1948 |
| 2,465,355 | Cook | Mar. 29, 1949 |